UNITED STATES PATENT OFFICE.

HARRIOTT H. RAVENEL, OF CHARLESTON, SOUTH CAROLINA, EXECUTRIX OF ST. JULIEN RAVENEL, DECEASED, ASSIGNOR TO THE STONEY LANDING COMPANY, OF SAME PLACE.

MANUFACTURE OF ARTIFICIAL STONE.

SPECIFICATION forming part of Letters Patent No. 283,358, dated August 14, 1883.

Application filed July 7, 1883. (No specimens.)

*To all whom it may concern:*

Be it known that ST. JULIEN RAVENEL, formerly a citizen of the United States, residing in Charleston, South Carolina, but now deceased, did, during his life-time, invent an Improvement in the Manufacture of Artificial Stone, of which the following is a specification.

The object of this invention is to rapidly and economically produce artificial stone homogeneous in character and well calculated to resist wear or atmospheric influence, and this object is attained in the manner hereinafter set forth.

In carrying out the invention a silicious marl is selected in which carbonate of lime is incorporated with silica, part of which is soluble. This marl is then burned, the degree of heat imparted, however, not being sufficient to calcine the marl, as in the manufacture of cements, but just enough to drive off the carbonic acid and moisture from the marl. The burned marl is then ground and mixed with sand, gravel, or finely-broken stone, preferably sand, under the influence of heat and moisture, this operation being conveniently effected by mixing the material in a closed vessel, to which steam is admitted. The effect of this treatment upon the lime and silica of the compound is to produce silicate of lime, which forms the bond of the artificial-stone composition. After the composition is formed it is molded, under pressure or otherwise, into suitable blocks, and then hardened.

Owing to the presence of very finely-divided silica, as well as soluble silica, in combination with lime in the marl, which forms the base of the composition, the formation of the silicate of lime is readily accomplished, the composition produced is of a very homogeneous character, and the stone is extremely hard and durable.

The proportion of silica in the marl may vary without affecting the main object of the invention. In practice a very good stone has been produced from marl containing about ten per cent. of soluble and twelve per cent. of insoluble silica to about sixty-four per cent. of lime, one part of the burned marl being added to four parts of fine sand, and the mixing under heat and moisture being continued for about an hour. The treatment may be continued longer than this, if desired, however, and the proportions of ingredients will depend in a measure upon the character of the stone to be produced.

I claim as the invention of the said ST. JULIEN RAVENEL—

The mode herein described of making artificial stone, said mode consisting in mixing, under the influence of heat and moisture, sand or equivalent material and ground marl containing silica, part of which is soluble, said marl having been previously burned to drive off the carbonic acid, as set forth.

In testimony whereof I have signed my name to this specification in the presence of two subscribing witnesses.

HARRIOTT H. RAVENEL,
*Executrix Estate of St. Julien Ravenel, deceased.*

Witnesses:
 REBECCA M. RUTLEDGE,
 HARRIOTT R. RAVENEL.